A. D. COLE.
COMBINATION TONGUE AND SEAT SUPPORT FOR TRACTORS.
APPLICATION FILED MAR. 24, 1921.
1,416,171. Patented May 16, 1922.
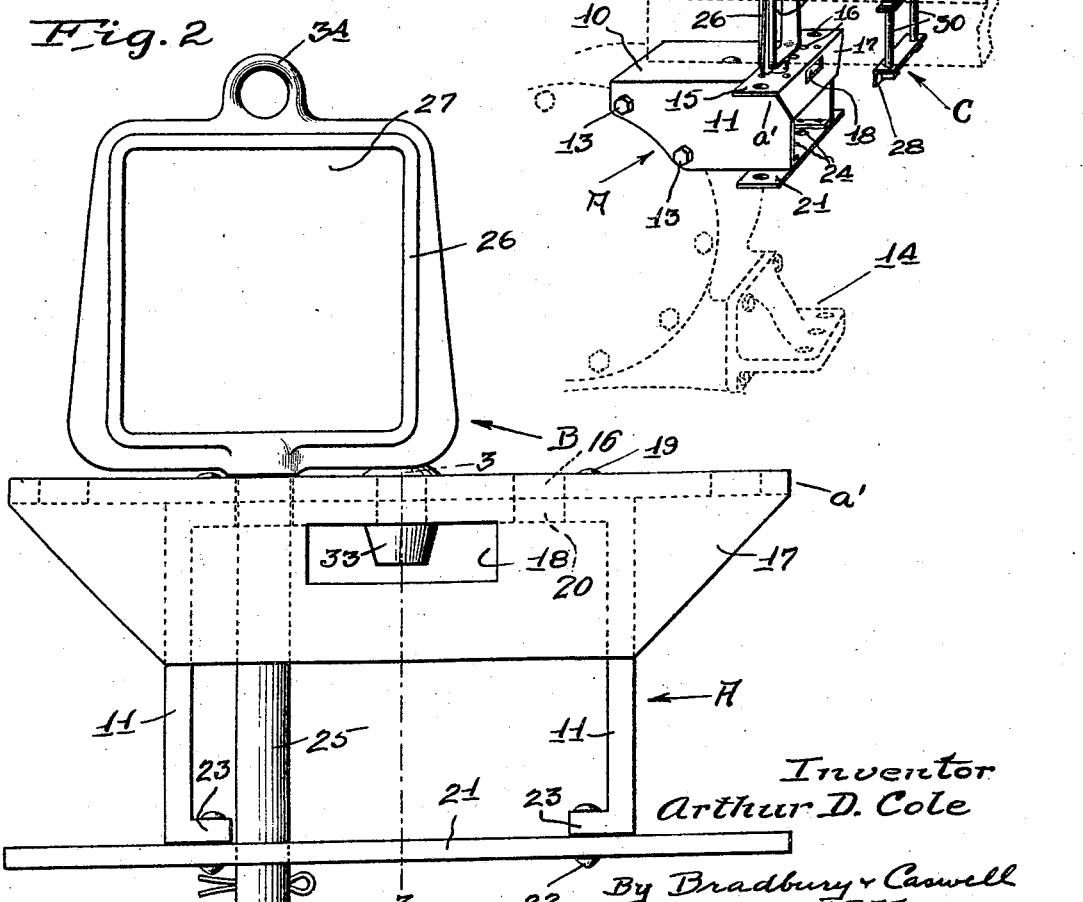
Inventor
Arthur D. Cole
By Bradbury & Caswell
Attorneys

UNITED STATES PATENT OFFICE.

ARTHUR DENNIS COLE, OF MINNEAPOLIS, MINNESOTA.

COMBINATION TONGUE AND SEAT SUPPORT FOR TRACTORS.

1,416,171.  Specification of Letters Patent.  Patented May 16, 1922.

Application filed March 24, 1921. Serial No. 455,229.

*To all whom it may concern:*

Be it known that I, ARTHUR DENNIS COLE, a citizen of the United States, residing in Minneapolis, in the county of Hennepin and State of Minnesota, have invented a new and useful Combination Tongue and Seat Support for Tractors, of which the following is a specification.

My invention relates to tongue and seat supports for tractors.

Its object is to provide a simple attachment for tractors adapted to slidably receive and limit the forward sliding movements of the tongue of an implement, said attachment serving, further, to supply a support to which a seat may be removably attached.

A further object is to supply a device of this nature, by which the tongue of an implement may be directed variously with respect to the line of travel to alter the draft of the implement.

With the foregoing and other objects in view, which will appear in the following description, the invention resides in the novel combination and arrangement of parts and in the details of construction hereinafter described and claimed.

In the drawings, Fig. 1 is a perspective view of a device embodying my invention, its application to a tractor frame and implement tongue being illustrated therein; Fig. 2 is a rear elevation, in detail, of said device, and Fig. 3 is a longitudinal, central, sectional view of the body illustrating a seat support as applied thereto.

Referring to the accompanying drawings, I have used the reference letter A to indicate the body of my device and B to designate a tongue receiving member adjustable laterally on said body. Said body A, in addition to supplying a mounting for the member B, is arranged to removably receive a seat support. The member B, in addition to slidably receiving the tongue of an implement, is adapted to co-act with a stop C, designed for adjustable application to an implement tongue to limit the forward sliding movement of said tongue in said member B.

The body A is channel-shaped and comprises a web 10 with depending flanges 11. These flanges are arranged to embrace the sides of a tractor frame, the forward ends of said flanges being perforated, as at 12, to receive original frame bolts 13, by which the body is rigidly secured to said frame in position, preferably above a tractor hitch 14 thereon. An angle beam $a'$, including a flange 15 formed with spaced apertures 16 and a flange 17 having a central slot 18 therein, is placed across the rear margin of the web 10, as shown, said flange 15 being secured to the web 10 by means of rivets 19 so that the apertures 16 register with like apertures 20 in said web. A second beam or bar 21 is carried under the body A and beneath the beam $a'$, the same being secured by rivets 22 to inturned lugs 23 on the lower edges of the flanges 11. Said second beam 21 is formed with apertures 24, registering with the apertures 16 in said first beam $a'$.

The member B includes a bolt 25, having a head 26 formed with a tongue receiving opening 27 therein. Said bolt is adapted to swivel in the various sets of registering apertures 16 and 24, its location being selected to accord with the various draft conditions in implements drawn by the tractor. This head 26 forms an abutment for the stop C and limits the forward sliding movement of a tongue therein.

The stop C may be of any suitable construction, but I prefer the following form: An angular bumper 28, arranged with one flange in pendent forward position, is joined at its ends with a strap 29 through clamping bolts 30. This structure provides a clamp readily applicable to the end of a tongue and easily secured thereto in various desired positions. The bumper member 28, striking the base of the head 26, arrests the relative forward movement of a tongue to which it is applied, the force of the impact between bumper and head being directed against the latter at a point best adapted to withstand the blow. Rearward movements of the tongue in the head 26 are limited by any of the numerous flexible draft connections employed between an implement and the tractor hitch.

I have arranged my device to receive a seat for the driver when the tractor is driven without an attached implement. The seats usually furnished with a tractor include a spring bar support 31, having an opening 32 at the base thereof to receive an attaching bolt on the tractor frame. The slot 18, in the beam $a'$, is formed to receive the lower end of such a support and a pin 33, depending from the web 10, is arranged to engage in the opening in said support to lock the same against longitudinal movement with respect to the body A, and prevent its accidental displacement or removal from said body.

In driving a tractor from a trailing implement, it is common practice to pass a control cord from the tractor mechanism to the implement. Turning movements of the tractor naturally tighten or slacken such a cord, thus necessitating constant attention on the part of the operator, in maintaining the proper tension thereof. I place an eye 34 on the top of the tongue receiving head 26 in axial relation with respect to the bolt 25. This eye provides a guide for a controlling cord and, being in alignment with the pivotal connection between tractor and implement, avoids the usual tightening and slackening of the cord during changes in travel.

Changes in the specific form of my invention, as herein disclosed, may be made within the scope of what is claimed without departing from the spirit of my invention.

Having described my invention, what I claim as new and desire to secure by Letters Patent is:

1. In a device of the class described, the combination with a tractor frame, having a hitch for implements, of a channel-shaped body above the hitch, the forward ends of the depending flanges on said body being adapted to embrace the sides of the tractor frame and to be rigidly anchored thereto, an angle beam, having an apertured flange, and a central slot in the other flange, said beam being secured to the body in position wherein the apertured flange lies across the rear margin of the web of said body and the slotted flange reaches vertically downward, a second beam secured against the lower edges of the body flanges and formed with apertures registering with the apertures in said first mentioned beam, a bolt, a tongue receiving head on the bolt, said bolt being adapted to be swivelled in said registering apertures, said slot in said first beam being adapted to receive the end of a seat support, and a locking pin depending from the web of the body adapted to engage in an opening in the seat support to removably secure the same with respect to said body.

2. In a device of the class described, the combination with a tractor frame, having a hitch for implements, of a channel-shaped body above the hitch, the lower rear edges of the depending flanges on said body being formed with horizontally turned lugs thereon, the forward ends of said flanges being adapted to embrace the sides of the tractor frame and to be rigidly anchored thereto, an angle beam, having an apertured flange, and a central slot in the other flange, said beam being secured upon the body in position wherein the apertured flange lies across the rear margin of the web of said body and the slotted flange reaches vertically downward, a second beam secured beneath the body to the lugs on the body flanges, said beam being formed with apertures therein registering with the apertures in said first mentioned beam, a bolt, a tongue receiving head on the bolt, said bolt being adapted to be swivelled in said registering apertures, said slot in said first beam being adapted to receive the end of a seat support, and a locking pin depending from the web of the body adapted to engage in an opening in the seat support to removably secure the same with respect to said body.

3. In a device of the class described, the combination with a tractor frame, having a hitch for implements, of a channel-shaped body above the hitch, the forward ends of the depending flanges on said body being adapted to embrace the sides of the tractor frame and to be rigidly anchored thereto, an angle beam, having an apertured flange, and a central slot in the other flange, said beam being secured by the body in position wherein the apertured flange lies across the rear margin of the web of said body and the slotted flange reaches vertically downward, a second beam secured beneath the body and formed with apertures registering with the apertures in said first mentioned beam, a bolt supplied with a head designed to slidably receive an implement tongue, said bolt being adapted to be swivelled in said registering apertures, a stop for adjustable application to an implement tongue adapted to co-act with the head of said bolt to limit the forward sliding movement of the tongue within said head, said slot in said first beam being adapted to receive the end of a seat support, and a locking pin depending from the web of the body adapted for engagement with an opening in the seat support to removably secure the same with respect to said body.

4. In a device of the class described, the combination of a body adapted to be rigidly secured to the frame of a tractor, a bolt, a head on said bolt designed to slidably receive the tongue of an implement drawn by the tractor, a stop adapted to be clamped in various positions upon the implement tongue, and bolt receiving members on the body in which said bolt may be swivelled in various upright positions laterally of said body to alter the draft of the implement, said stop being arranged to abut against the head of said bolt and limit the forward sliding movement of an implement tongue therein.

5. In a device of the class described, the combination of a body adapted to be rigidly secured to the frame of a tractor, a bolt, a head on said bolt designed to slidably receive the tongue of an implement drawn by the tractor, bolt receiving members on said body in which said bolt may be swivelled in various upright positions laterally of said body to alter the draft of the implement, seat support receiving means and a locking device for seat supports on said body.

6. In a device of the class described, the combination of a body adapted to be rigidly secured to the frame of a tractor, a bolt, a head on said bolt designed to slidably receive the tongue of an implement drawn by the tractor, bolt receiving members on said body in which said bolt may be swivelled in various upright positions laterally of said body to alter the draft of the implement, and seat support receiving means on said body.

7. In a device of the class described, the combination of a body adapted to be rigidly secured to the frame of a tractor, a bolt, a head on said bolt designed to slidably receive the tongue of an implement drawn by the tractor, and bolt receiving members on said body in which said bolt may be swivelled in various upright positions laterally of said body to alter the draft of the implement.

8. In a device of the class described, the combination of a body adapted to be rigidly secured to the frame of a tractor, a bolt, a head on said bolt designed to slidably receive the tongue of an implement drawn by the tractor, bolt receiving members on said body in which said bolt may be swivelled in various upright positions laterally of said body to alter the draft of the implement, and a control cord guide on said tongue receiving head in alignment with the axis of the bolt.

In testimony whereof, I have signed my name to this specification.

ARTHUR DENNIS COLE.